United States Patent
Suleman

(10) Patent No.: US 10,860,627 B2
(45) Date of Patent: Dec. 8, 2020

(54) SERVER AND METHOD FOR CLASSIFYING ENTITIES OF A QUERY

(71) Applicant: Microsoft Technology Licensing, LLC, Redmond, WA (US)

(72) Inventor: Kaheer Suleman, Cambridge (CA)

(73) Assignee: Microsoft Technology Licensing LLC, Redmond, WA (US)

( * ) Notice: Subject to any disclaimer, the term of this patent is extended or adjusted under 35 U.S.C. 154(b) by 547 days.

(21) Appl. No.: 15/319,752

(22) PCT Filed: Jun. 16, 2015

(86) PCT No.: PCT/CA2015/000391
§ 371 (c)(1),
(2) Date: Dec. 16, 2016

(87) PCT Pub. No.: WO2015/192212
PCT Pub. Date: Dec. 23, 2015

(65) Prior Publication Data
US 2017/0124182 A1   May 4, 2017

Related U.S. Application Data

(60) Provisional application No. 62/013,274, filed on Jun. 17, 2014.

(51) Int. Cl.
*G06F 16/332* (2019.01)
*G06F 16/35* (2019.01)
*G06F 16/33* (2019.01)

(52) U.S. Cl.
CPC ...... *G06F 16/3329* (2019.01); *G06F 16/3344* (2019.01); *G06F 16/353* (2019.01)

(58) Field of Classification Search
None
See application file for complete search history.

(56) References Cited

U.S. PATENT DOCUMENTS

2007/0219973 A1\* 9/2007 Cui .................. G06F 16/2435
2012/0254143 A1   10/2012 Varma et al.
(Continued)

FOREIGN PATENT DOCUMENTS

| WO | 2012033511 | 3/2012 |
|----|------------|--------|
| WO | 2013010262 | 1/2013 |
| WO | 2013155619 | 10/2013 |

OTHER PUBLICATIONS

Abinaya et al., AMRITA CEN@FIRE-2014: Named Entity Recognition for Indian Languages using Rich Features Dec. 7, 2014, ACM, 103-11.\*

(Continued)

*Primary Examiner* — Jason G Liao

(57) ABSTRACT

A server, method, and non-transitory computer readable medium for ranking a plurality of data sources are provided. The server includes a network interface, a memory storage unit and a processor. The method involves receiving an input query, identifying entities of the input query using conditional random fields, generating a normalized query and applying a support vector machine to the normalized query. The non-transitory computer readable medium is encoded with programming instructions to direct a processor to carry out the method.

33 Claims, 4 Drawing Sheets

(56) References Cited

U.S. PATENT DOCUMENTS

2013/0226935 A1* 8/2013 Bai ................. G06N 20/00
707/748
2015/0286747 A1* 10/2015 Anastasakos ....... G06F 16/9017
707/776

OTHER PUBLICATIONS

Kong et al., Towards subject independent continuous sign language recognition: A segment and merge approach 2014, Pattern Recognition, vol. 47, 1294-1308.*
PCT International Search Report and Written Opinion in PCT/CA2015/000391, dated Oct. 13, 2015, 8 pages.
PCT International Preliminary Report on Patentability in PCT/CA2015/000391, dated Dec. 20, 2016, 6 pages.

* cited by examiner

SERVER AND METHOD FOR CLASSIFYING ENTITIES OF A QUERY

CROSS-REFERENCE TO RELATED APPLICATION

This application is a U.S. National Stage Application of PCT/CA2015/000391, filed Jun. 16, 2015, which claims benefit of U.S. Provisional Patent Application No. 62/013,274, filed Jun. 17, 2014, which applications are hereby incorporated by reference in their entireties. To the extent appropriate, a claim of priority is made to each of the above disclosed applications.

This application claims priority to of U.S. Patent Application No. 62/013,274 filed Jun. 17, 2014, the contents of which are incorporated herein by reference.

FIELD

The present specification relates to servers and methods of classification of queries, and more particularly to servers and methods of classifying entities of the same type into sub-types.

BACKGROUND

Processing an input query received in the form of natural language is often difficult because natural language inherently includes ambiguities that require clarification or understanding of the context. For example, a query can include several entities that would appear similar to a processor trying to classify the entities using known models. Two such known models are conditional random field and support vector machine.

Conditional random field models are a type of statistical modeling method that are often applied to pattern recognition problems such as for machine learning. Conditional random field models are often used to parse and label entities in natural language queries. In particular, linear chain conditional random field is commonly used to predict sequences of labels for input queries. However, conditional random field models generally have difficulty distinguishing entities of the same type since the entities appear similar in a natural language query without taking context into account. For example, the conditional random field models would have difficulty distinguishing between a "start time" and an "end time" in an input query requesting the creation of a calendar event between the "start time" and the "end time".

In contrast, support vector machines are learning models that analyze data and classify the data into one of two categories based on a regression analysis. From a set of training examples, a support vector machine training algorithm can build a model that can be used to assign input queries into one category over another. Accordingly, since the a support vector machine typically analyzes the entire input query at once, the support vector machine is not efficient at identifying the entities in a query such that the entities can be extracted and returned to a client device.

SUMMARY

In accordance with an aspect of the specification, there is provided a server for classifying entities of an input query. The server includes a network interface for receiving the input query. The input query includes a first entity and a second entity. The first entity and the second entity belong to an entity type. Furthermore, the server includes a memory storage unit for storing the input query and for storing programming instructions. In addition, the server includes a processor in communication with the network interface and the memory storage unit. The processor is configured to identify the first entity and the second entity in the input query using a conditional random field model. The processor is further configured to generate a normalized query by replacing the first entity of the input query with a first generic identifier and replace the second entity of the input query with a second generic identifier. The processor is further configured to apply a support vector machine model to the normalized query to determine a first sub-type of the first generic identifier and a second sub-type of the second generic identifier.

The processor may be configured to extract the first entity and the second entity from the input query.

The processor may be configured to extract a first plurality of features associated with the first entity.

The processor may be configured to extract the first plurality of features from a first window.

The processor may be configured to apply a support vector machine model to the first plurality of features.

The first window may be a predetermined first window size.

The predetermined first window size may be three words.

The predetermined first window size may be adjustable for to optimize performance.

The processor may be configured to extract a second plurality of features associated with the second entity.

The processor may be configured to extract the second plurality of features from a second window.

The processor may be configured to apply a support vector machine model to the second plurality of features.

The second window may be a predetermined second window size.

The predetermined second window size may be three words.

The predetermined second window size may be adjustable for to optimize performance.

The predetermined second window size may be same as the predetermined first window size.

The processor may be configured to apply the support vector machine model to multiple classes.

In accordance with an aspect of the specification, there is provided a method of classifying entities of an input query. The method involves receiving the input query. The input query has a first entity and a second entity. The first entity and the second entity belong to an entity type. Furthermore, the method involves identifying the first entity and the second entity in the input query using a conditional random field model. In addition, the method involves generating a normalized query by replacing the first entity of the input query with a first generic identifier and replacing the second entity of the input query with a second generic identifier. Also, the method involves applying a support vector machine model to the normalized query to determine a first sub-type of the first generic identifier and a second sub-type of the second generic identifier.

The method may further involve extracting the first entity and the second entity from the input query.

The method may further involve extracting a first plurality of features associated with the first entity.

Extracting the first plurality of features may involve extracting the first plurality of features from a first window.

Applying a support vector machine model to the normalized query may involve applying a support vector machine model to the first plurality of features.

The first window may be a predetermined first window size.

The predetermined first window size may be three words.

The predetermined first window size may be adjustable for to optimize performance.

The method may further involve extracting a second plurality of features associated with the second entity.

Extracting the second plurality of features may involve extracting the second plurality of features from a second window.

Applying a support vector machine model to the normalized query may involve applying a support vector machine model to the second plurality of features.

The second window may be a predetermined second window size.

The predetermined second window size may be three words.

The predetermined second window size may be adjustable for to optimize performance.

The predetermined second window size may be same as the predetermined first window size.

Applying the support vector machine model may involve applying the support vector machine model to multiple classes.

In accordance with an aspect of the specification, there is provided a non-transitory computer readable medium encoded with codes for classifying entities of an input query. The codes are for directing a processor to receive the input query. The input query has a first entity and a second entity. The first entity and the second entity belong to an entity type. Furthermore, the codes are for directing a processor to identify the first entity and the second entity in the input query using a conditional random field model. In addition, the codes are for directing a processor to generate a normalized query by replacing the first entity of the input query with a first generic identifier and replace the second entity of the input query with a second generic identifier. Also, the codes are for directing a processor to apply a support vector machine model to the normalized query to determine a first sub-type of the first generic identifier and a second sub-type of the second generic identifier.

BRIEF DESCRIPTION OF THE DRAWINGS

Reference will now be made, by way of example only, to the accompanying drawings in which.

DETAILED DESCRIPTION OF THE EMBODIMENTS

Figure 1:
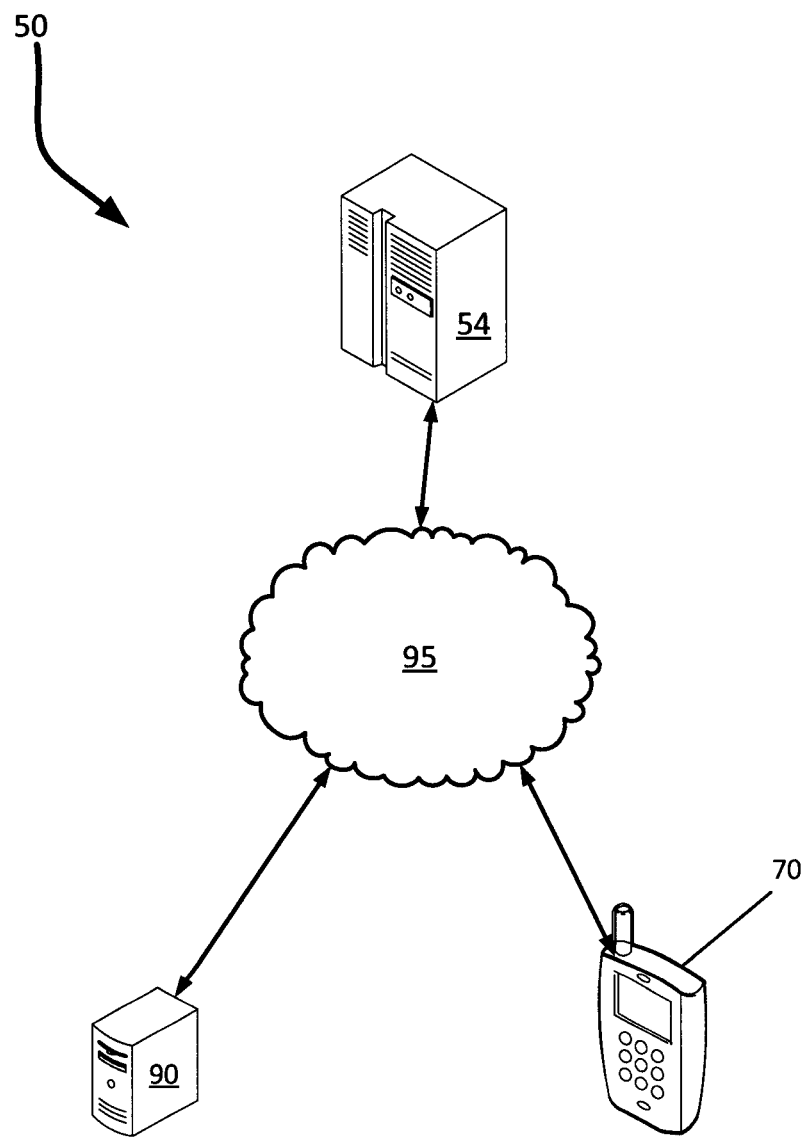
FIG. 1 is a schematic representation of a system for classifying entities of an input query in accordance with an embodiment.

Referring to FIG. 1, a schematic representation of a computer network system is shown generally at 50. It is to be understood that the system 50 is purely exemplary and it will be apparent to those skilled in the art that a variety of computer network systems are contemplated. The system 50 includes a server 54, a client device 70, and a data source 90 for providing information. The server 54, the client device 70, and the data source 90 are connected by a network 95.

The network 95 is not particularly limited and can include any type of network such as the Internet, an intranet or a local area network, a mobile network, or a combination of any of these types of networks. In some embodiments, the network 95 can also include a peer to peer network.

In the present embodiment, the server 54 can be any type of computing device generally used to receive input, process the input and provide output. The server 54 is not particularly limited and can include a variety of different devices depending on the specific application of the server 54. For example, the server 54 can be optimized for its specific role in the system 50, such as for communicating with the client device 70 and the data source 90. Suitable devices the server 54 can include high performance blade server systems running UNIX operating systems, and having multiple processors. Alternatively, the server 54 can include devices such as a personal computer, a personal digital assistant, a tablet computing device, cellular phone, or laptop computer configured to carry out similar functions for systems not requiring a server with significant processing power. In other embodiments, the server 54 can also be implemented as a virtual server, a rented server session in the cloud, or any combination of the above.

The client device 70 can be any type of computing device used to communicate with the server 54 over the network 95 for generally submitting input queries. It is to be appreciated that, in general, the client device 70 includes programming instructions in the form of codes stored on a computer readable medium for performing various functions. For example, the codes can be in the form of a downloadable application. In the present embodiment, the client device 70 can be any one of a personal computer, a laptop computer, a portable electronic device, a gaming device, a mobile computing device, a portable computing device, a tablet computing device, a personal digital assistant, a cell phone, or a smart phone. In the present embodiment, the client device 70 is configured to send an input query to the server 54 and to provide information in response to the input query. The input query is not particularly limited and can be any type of input query, such as a request for information from the data source 90 or an instruction to control the client device 70.

In the present embodiment, the data source 90 is generally configured to provide information upon receiving an input query. The manner by which the data source 90 operates is not particularly limited. For example, in the present embodiment, the data source 90 can be associated with a service provider. In particular, the data source 90 can be associated with a service provider that offers a database of general businesses, such as restaurants, hotels, theatres, etc. for which a user at the client device 70 may want to search or obtain more information. It is to be appreciated, with the benefit of this description, that although a single data source 90 is shown in FIG. 1, the system 50 is not necessarily limited to having the single data source 90. For example, in other embodiments, the system 50 can be modified to include a plurality of data sources where data sources can provide complimentary information or overlapping information. In further embodiments, the data source 90 can also be modified to be part of a database within the server 54, or can be omitted altogether when no external information is requested, such as for an input query sent from the client device 70 to the server 54 to control a local feature of the client device 70, such as starting an application, editing a calendar event, adjusting the volume, etc.

It is to be re-emphasized that the system 50 described above is a non-limiting representation only. For example, although the network 95 of the present embodiment shown in FIG. 1 connects the server 54, the client device 70, and the data source 90, other embodiments can include separate networks for connecting the server 54 to the client device 70, and the server 54 to the data source 90.

Figure 2:
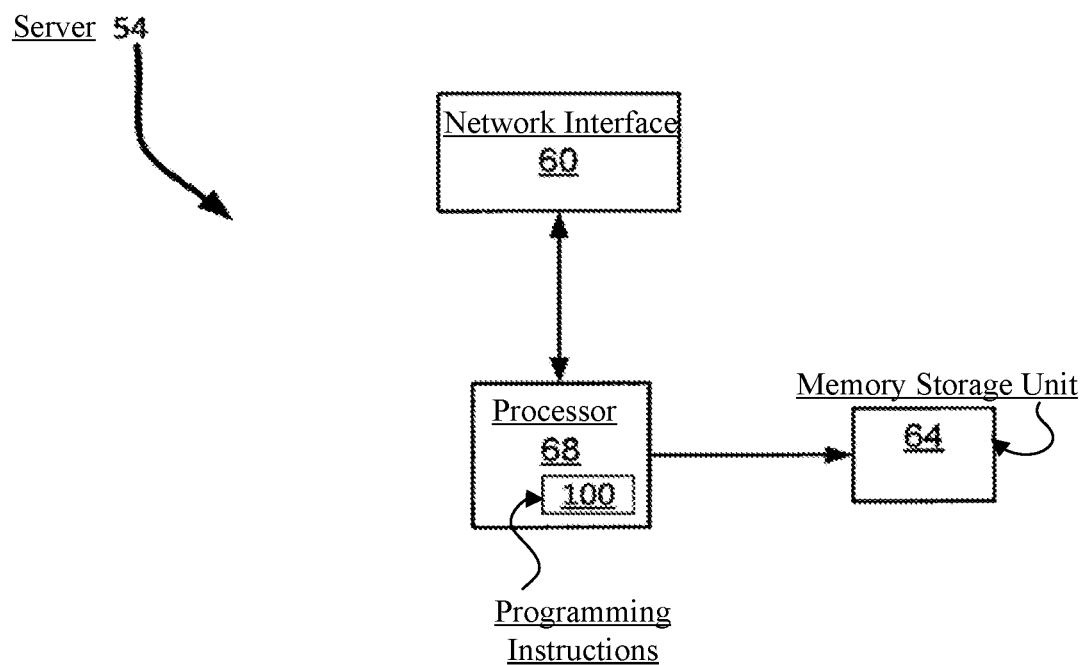
FIG. 2 is a schematic representation of a server in accordance with the embodiment shown in FIG. 1.

Referring to FIG. 2, a schematic block diagram showing various components of the server 54 is provided. It should be emphasized that the structure in FIG. 2 is purely exemplary and several different implementations and configurations for the server 54 are contemplated. The first server 54 includes a network interface 60, and a memory storage unit 64, and a processor 68.

The network interface 60 is not particularly limited and can include various network interface devices such as a network interface controller (NIC) capable of communicating with the client device 70 and the data source 90 across the network 95. In the present embodiment, the network interface 60 is generally configured to connect to the network 95 via a standard Ethernet connection.

The memory storage unit 64 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). In the present embodiment, the memory storage unit 64 is generally configured to temporarily store input queries received from the client device 70 for processing as well as any input queries for sending on to the data source 90. In addition, the memory storage unit 64 is configured to store codes for directing the processor 68 for carrying out computer implemented methods. For example, the codes can include the programming instructions 100 further described below.

The processor 68 is not particularly limited and is generally configured to execute programming instructions 100 for classifying entities of an input query. The manner by which the entities of the input queries are classified is not particularly limited and will be discussed in greater detail below. For example and to provide greater clarity to the understanding of the present embodiment, it can be assumed that the input query includes at least two of entities of the same type, such as a start time and an end time where both entities are of the time type. It is to be appreciated, with the benefit of this specification that an entity type is not particularly limited and generally determined based on a comparison of the distribution of features are similar when extracted using a conditional random field model. As another example, an origin and a destination in regard to navigation can be of the same type since they are both places.

In the present embodiment, the programming instructions 100 include a natural language processing engine. It is to be appreciated that several different types of natural language processing engines are contemplated. For example, the natural language processing engine can be based on support vector machine analysis, decision trees, Bayesian networks, neural networks, or any combination thereof. In general, the server 54 receives an input query from the client device 70 via the network interface 60 and the programming instructions 100 analyze the input query to identify at least two entities of the same type and further classify the entities into sub-types. The manner by which the input query is received is not particularly limited and the input query can be received in one or more formats. For example, the query can be in the form of a text string or an audio file.

Figure 3:
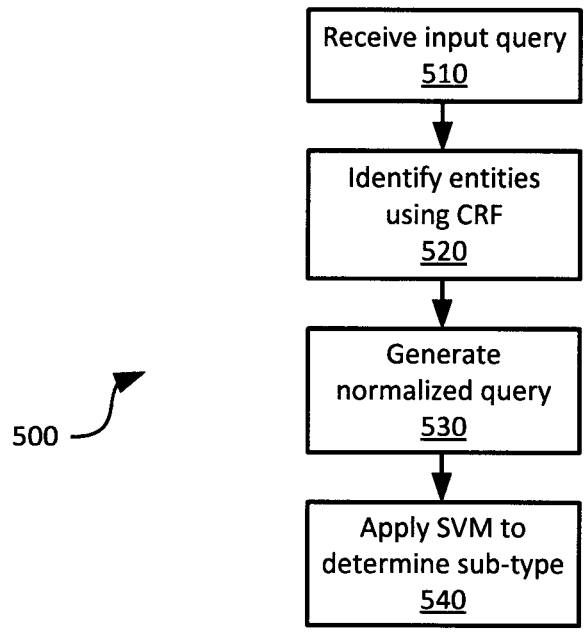
FIG. 3 is a flow chart of a method of classifying entities of an input query in accordance with an embodiment.

Referring to FIG. 3, a method of classifying entities of an input query is represented in the form of a flow-chart and indicated generally at 500. In order to assist in the explanation of the method 500, it will be assumed that the method 500 is performed using the system 50. Furthermore, the following discussion of the method 500 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 500 can be varied, and need not work exactly as discussed herein in conjunction with each other, and that such variations are within the scope of the present invention. Furthermore, it is to be emphasized, that method 500 need not be performed in the exact sequence as shown and that various blocks can be performed in parallel rather than in sequence; hence the elements of the method 500 are referred to herein as "blocks" rather than "steps".

Block 510 comprises receiving an input query having at least two entities of the same entity type at the server 54 from the client device 70. In the present embodiment, the input query is a text string received from the client device 70; however, it is to be appreciated, with the benefit of this specification, that the manner by which a query is received is not particularly limited. For example, the query can be received in other formats such as an audio file, an image file, a proprietary format, or in an encrypted format. Furthermore, the query can also be received in a pre-processed format from the client device 70. For example, in other embodiments, one or more of the following blocks 520, 530, and/or 540 discussed in greater detail below can be carried out on the client device prior to the server 54 receiving a pre-processed input query.

It is to be appreciated, with the benefit of this description, that the input query is ultimately associated with input received at the client device 70. The origin of the input at the client device 70 is not particularly limited and can be a user of the device or the output of another electronic device. The input received at the client device 70 is not particularly limited and can include sounds received through a microphone, data received via an input device such as a keyboard, images captured using a camera, or data received from another electronic device. In the present embodiment, the input received at the client device 70 is pre-processed into a normalized format to aid in classification at the server 54. However, it is to be appreciated that in other embodiments, the raw input can be forwarded to the server 54 for direct processing or pre-processing at the server 54.

It is to be appreciated that several variations for receiving an input query can be considered. Furthermore, it is also to be appreciated that the server 54 can operate a service offered separately to third parties who provide the server 54 with input queries and receive a classification of the entities in return.

It is also to be re-emphasized that the manner by which the server 54 receives input queries and the input queries themselves are not particularly limited. For example, the input queries can represent commands to be carried out on the client device 70, or the input queries can represent a request for further information. For discussion purposes, it can be assumed that the input query received at block 520 is a text string "Please move my 3 pm alarm ahead to 4 pm" received from the client device 70. It is to be appreciated, with the benefit of this specification, that the present example is a command intended to be executed on the client device 70.

Block 520 comprises identifying at least two entities of the same entity type in the input query using a conditional random field model. For example, in the present embodiment, a linear chain conditional random field model is used. However, it is to be appreciated that this is not particularly limited and that another conditional random field model can be used in other embodiments.

The manner by which the entities are identified is not particularly limited. Continuing with the present example input query received above in block 510, using a conditional random field model on the input query would identify 3 pm and 4 pm as entities belonging to the entity type TIME. However, it is to be appreciated, with the benefit of this description, that the application of the conditional random field model would not be able to distinguish between the two entities any further. For example, the processor 68 would not be able to distinguish that 3 pm is the original time of the alarm and that 4 pm is the new time.

Block 530 comprises generating a normalized query from the input query using the conditional random field model. The manner by which the normalized query is generated is not particularly limited. For example, each of the entities of the same entity type is replaced with a generic identifier. In the present embodiment, each of the entities of the same entity type is extracted and replaced with the same generic identifier. However, it is to be appreciated that in other embodiments, each entity can be replaced with a different generic identifier to distinguish between the entities. Continuing with the present example, the processor 68 would generate the normalized query "Please move my [TIME] alarm ahead to [TIME]".

Block 540 comprises applying a support vector machine model to the normalized query generated from block 530 to determine a sub-type for each of the generic identifiers. For example, in the present embodiment, a C-support vector classification (C-SVC) is used. However, it is to be appreciated that this is not particularly limited and that another support vector machine model can be used in other embodiments.

The manner by which the entities are classified into entity sub-types is not particularly limited. Continuing with the present example the normalized query "Please move my [TIME] alarm ahead to [TIME]" would be analyzed using the support vector machine. In the present embodiment, two classes are considered by the support vector machine model. In the first class, the normalized generic identifiers can correspond to entities have sub-types of ORIGINALTIME and NEWTIME, respectively. In the second class, the normalized generic identifiers can correspond to entities have sub-types of NEWTIME and ORIGINALTIME, respectively.

It is to be re-emphasized that the method 500 described above is a non-limiting representation only. For example, although the present embodiment discusses a support vector machine applying a binary classification to the normalized query, it is to be understood that variations are contemplated. For example, the support vector machine model can be applied to a multiclass situation such as one where the entities have more than two sub-types.

Figure 4:
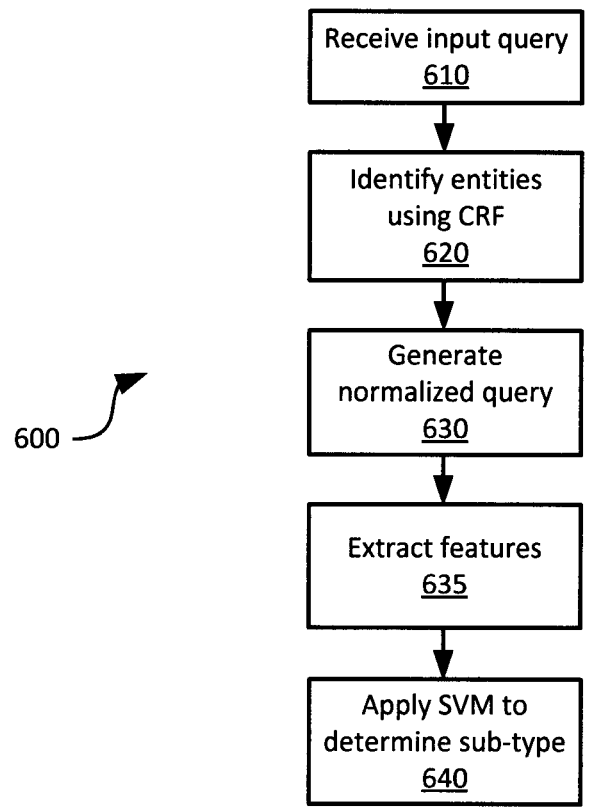
FIG. 4 is a flow chart of a method of classifying entities of an input query in accordance with another embodiment.

Referring to FIG. 4, a method of classifying entities of an input query in accordance with another embodiment is represented in the form of a flow-chart and indicated generally at 600. In order to assist in the explanation of the method 600, it will be assumed that the method 600 is also performed using the system 50. Furthermore, the following discussion of the method 600 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 600 can be varied, and need not work exactly as discussed herein in conjunction with each other, and that such variations are within the scope of the present invention. Furthermore, it is to be emphasized, that method 600 need not be performed in the exact sequence as shown and that various blocks can be performed in parallel rather than in sequence; hence the elements of the method 600 are referred to herein as "blocks" rather than "steps".

Block 610 comprises receiving an input query having at least two entities of the same entity type at the server 54 from the client device 70. The manner in which the input query is received is not particularly limited and includes methods similar to those described above in regard to block 510.

Block 620 comprises identifying at least two entities of the same entity type in the input query using a conditional random field model. The manner in which entities are identified is not particularly limited and includes methods similar to those described above in regard to block 520.

Block 630 comprises generating a normalized query from the input query using the conditional random field model. The manner by which the normalized query is generated is not particularly limited and includes methods similar to those described above in regard to block 530.

Block 635 comprises extracting a plurality of features associated with each entity of the same entity type. It is to be appreciated that the manner by which the plurality of features is extracted is not particularly limited and that the plurality of features associated with an entity can be predetermined based on rules, or can be dynamically adjustable for optimization of the method 600.

Continuing with the example discussed above in the method 500, it can be assumed that the plurality of features associated with an entity can be defined within in the window of the three words prior to the entity in question. Accordingly, the extracted features associated with the first [TIME] of the normalized query can be "please, move, my". The extracted features associated with the second [TIME] of the normalized query can be "alarm, ahead, to". Although the window size is the same for all entities in the present embodiment, in other embodiments, the features associated with each entity of the normalized query can be defined differently such that the window size for each entity of the normalized query can be different.

Block 640 comprises applying a support vector machine model to the features extracted from block 635 to determine a sub-type for each of the generic identifiers.

Various advantages will now be apparent to a person of skill in the art. Of note is the ability combine two models to analyze an input query having natural language and multiple entities. By identifying each of the entities of the same type and subsequently returning the values associated with each sub-type to the client device 70 would be able to receive and process commands in natural language at the client device 70 involving multiple entities of the same type. Furthermore, it is to be appreciated, by a person of skill in the art with the benefit of this description, that using the two separate models sequentially provides an improvement in the efficiency for processing natural languages to improve response times and decrease the computation cost of handling input queries having entities of the same type.

While specific embodiments have been described and illustrated, such embodiments should be considered illustrative only and should not serve to limit the accompanying claims.

What is claimed is:

1. A server for generating an output command by classifying entities of an input query, the server comprising:
a network interface for receiving the input query;
a memory storage unit for storing the input query and for storing programming instructions; and
a processor in communication with the network interface and the memory storage unit, the processor configured to:
identify a first entity and a second entity in the input query using a conditional random field model, wherein the first entity and the second entity are distinct entities within a same entity type;
generate a normalized query by replacing the first entity of the input query with a first generic identifier representing the same entity type and replacing the second entity of the input query with a second generic identifier representing the same entity type, wherein the first generic identifier and the second generic identifier are the same;
determine a first feature for the first entity based on at least a first word within a first window of words associated with the first generic identifier in the normalized query;
determine a second feature for the second entity based on at least a second word within a second window of words associated with the second generic identifier entity in the normalized query;
determine, using a support vector machine model on the normalized query including the first and second generic identifiers, a first sub-entity type of the same entity type for the first entity based on the first feature and a second sub-entity type of the same entity type for the second entity based on the second feature, wherein the first sub-entity type and the second sub-entity type are distinct sub-entity types within the same entity type; and
generate the output command in response to the input query, wherein the output command is generated based on at least the first entity belonging to the first sub-entity type and the second entity belonging to the second sub-entity type.

2. The server of claim 1, wherein the processor is configured to extract the first entity and the second entity from the input query.

3. The server of claim 2, wherein the processor is configured to extract a first plurality of features associated with the first entity.

4. The server of claim 3, wherein the processor is configured to extract the first plurality of features from the first window of words.

5. The server of claim 4, wherein the processor is configured to apply the support vector machine model to the first plurality of features.

6. The server of claim 5, wherein the first window of words has a predetermined first window size.

7. The server of claim 6, wherein the predetermined first window size of the first window of words and a second window size of the second window of words are the same.

8. The server of claim 6, wherein the predetermined first window size of the first window of words and a second window size of the second window of words are distinct.

9. The server of claim 3, wherein the processor is configured to extract a second plurality of features associated with the second entity.

10. The server of claim 9, wherein the processor is configured to extract the second plurality of features from the second window of words.

11. The server of claim 10, wherein the processor is configured to apply the support vector machine model to the second plurality of features.

12. The server of claim 11, wherein the second window of words has a predetermined second window size.

13. The server of claim 12, wherein the predetermined second window size of the second window of words and a first window size of the first window of words are the same.

14. The server of claim 12, wherein the predetermined second window size of the second window of words and a first window size of the first windows of words are distinct.

15. The server of claim 12, wherein the predetermined second window size is the same as the predetermined first window size.

16. The server of claim 1, wherein the processor is configured to apply the support vector machine model to multiple classes.

17. A method of generating an output command by classifying entities of an input query, the method comprising:
receiving the input query;
identifying a first entity and a second entity in the input query using a conditional random field model, wherein the first entity and the second entity are distinct entities within a same entity type;
generating a normalized query by replacing the first entity of the input query with a first generic identifier representing the same entity type and replacing the second entity of the input query with a second generic identifier representing the same entity type, wherein the first generic identifier and the second generic identifiers are the same;
determining a first feature for the first entity based on at least a first word within a first window of words associated with the first generic identifier in the normalized query;
determining a second feature for the second entity based on at least a second word within a second window of words to associated with the second generic identifier in the normalized query;
determining, using a support vector machine model on the normalized query including the first and second generic identifiers, a first sub-entity type of the same entity type for the first entity based on the first feature and a second sub-entity type of the same entity type for the second entity based on the second feature, wherein the first sub-entity type and the second sub-entity type are distinct sub-entity types within the same entity type; and
generating the output command in response to the input query, wherein the output command is generated based on at least the first entity belonging to the first sub-entity type and the second entity belonging to the second sub-entity type.

18. The method of claim 17, further comprising extracting the first entity and the second entity from the input query.

19. The method of claim 18, further comprising extracting a first plurality of features associated with the first entity.

20. The method of claim 19, wherein extracting the first plurality of features comprises extracting the first plurality of features from the first window of words.

21. The method of claim 20, wherein using the support vector machine model on the normalized query comprises applying the support vector machine model to the first plurality of features.

22. The method of claim 21, wherein the first window of words has a predetermined first window size.

23. The method of claim 22, wherein the predetermined first window size of the first window of words and a second window size of the second window of words are distinct.

24. The method of claim 22, wherein the predetermined first window size of the first window of words is adjustable to optimize performance.

25. The method of claim 19, further comprising extracting a second plurality of features associated with the second entity.

26. The method of claim 25, wherein extracting the second plurality of features comprises extracting the second plurality of features from the second window of words.

27. The method of claim 26, wherein using the support vector machine model to the normalized query comprises applying the support vector machine model to the second plurality of features.

28. The method of claim 27, wherein the second window of words has a predetermined second window size.

29. The method of claim 28, wherein the predetermined second window size of the second window of words and a first window size of the first window of words are the same.

30. The method of claim 28, wherein the predetermined second window size of the second window of words and a first window size of the first windows of words are distinct.

31. The method of claim 28, wherein the predetermined second window size is the same as the predetermined first window size.

32. The method of claim 17, wherein using the support vector machine model comprises applying the support vector machine model to multiple classes.

33. A non-transitory computer readable medium encoded with programming instructions for generating an output command by classifying entities of an input query, the codes for directing a processor to:
receive the input query;
identify a first entity and a second entity in the input query using a conditional random field model, wherein the first entity and the second entity are distinct entities within a same entity type;
generate a normalized query by replacing the first entity of the input query with a first generic identifier representing the same entity type and replacing the second entity of the input query with a second generic identifier representing the same entity type, wherein the first generic identifier and the second generic identifier are the same;
determine a first feature for the first entity based on at least a first word within a first window of words associated with the first generic identifier in the normalized query;
determine a second feature of the second entity based on at least a second word within a second window of words associated with the second generic identifier in the normalized query;
determine, using a support vector machine model on the normalized query including the first and second generic identifiers, a first sub-entity type of the same entity type for the first entity based on the first feature and a second sub-entity type of the same entity type for the second entity based on the second feature, wherein the first sub-entity type and the second sub-entity type are distinct sub-entity types within the same entity type; and
generate the output command in response to the input query, wherein the output command is generated based on at least the first entity belonging to the first sub-entity type and the second entity belonging to the second sub-entity type.

* * * * *